United States Patent
Seymour, II et al.

(10) Patent No.: US 7,234,706 B2
(45) Date of Patent: Jun. 26, 2007

(54) SEALING SYSTEM FOR MULTIPLE FLUIDS

(75) Inventors: Kenneth R. Seymour, II, Sheboygan, WI (US); Edgardo Y. Estacio, Itasca, IL (US); John A. Serio, Lake In The Hills, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 227 days.

(21) Appl. No.: 10/886,819

(22) Filed: Jul. 8, 2004

(65) Prior Publication Data

US 2006/0006613 A1    Jan. 12, 2006

(51) Int. Cl.
*F02F 11/00* (2006.01)

(52) U.S. Cl. .............. 277/594; 277/598; 277/591

(58) Field of Classification Search .............. 277/590, 277/591, 594, 595, 596, 598, 644, 626; D23/269; 123/446, 458
See application file for complete search history.

(56) References Cited

U.S. PATENT DOCUMENTS

| | | | | |
|---|---|---|---|---|
| 3,048,415 A | * | 8/1962 | Shook ................... 277/615 |
| 3,228,039 A | * | 1/1966 | Freeman .................. 4/694 |
| 4,103,901 A | * | 8/1978 | Ditcher ................. 277/606 |
| 5,228,702 A | * | 7/1993 | Browne et al. ........... 277/608 |
| 5,513,926 A | * | 5/1996 | Prescott .................. 404/26 |
| D380,039 S | * | 6/1997 | Sutherland et al. ...... D23/269 |
| 6,129,485 A | * | 10/2000 | Grabe et al. ............ 405/152 |
| 6,196,760 B1 | * | 3/2001 | Sinclair .................. 404/26 |
| 6,581,940 B2 | * | 6/2003 | Dittel ................... 277/606 |
| 6,854,703 B2 | * | 2/2005 | Parker et al. ........... 251/30.01 |

* cited by examiner

Primary Examiner—William L. Miller
(74) Attorney, Agent, or Firm—Susan L. Lukasik; Elias P. Soupos; Jeffrey P. Calfa

(57) ABSTRACT

A seal (301) has a first surface capable of contacting a valve cover (101) over a first fluid while a second surface, opposed to the first surface, is capable of contacting a seal seat (303). The seal (301) also has a third surface capable of contacting a sensor (201) disposed in a second fluid, while a fourth surface, opposed to the third surface, is capable of contacting the seal seat (303). The seal (301) is capable of separating the first fluid from the second fluid while preventing the first fluid and the second fluid from leaking out of the valve cover (101).

17 Claims, 4 Drawing Sheets

FIG. 7
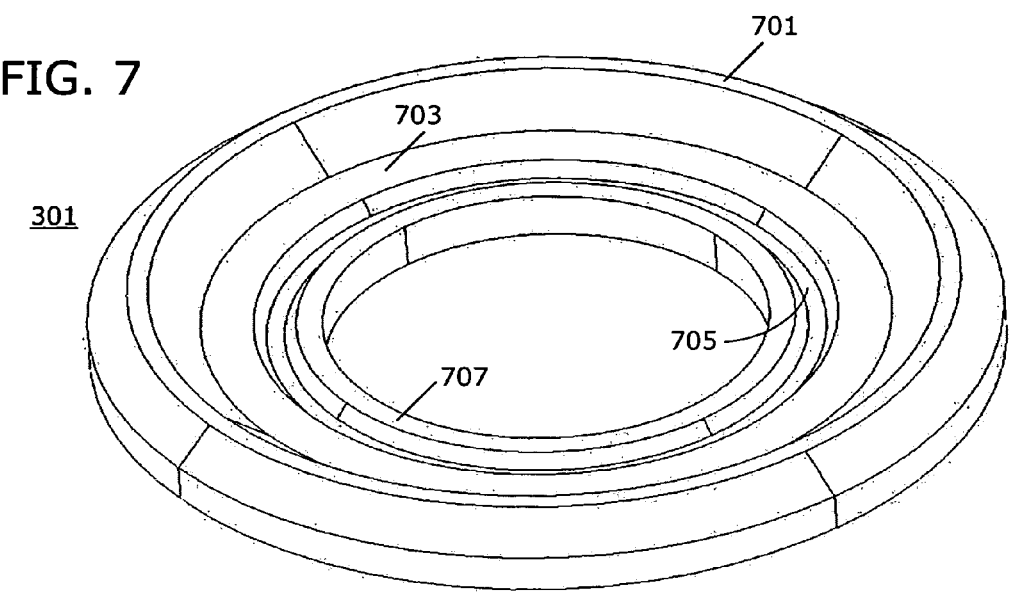
FIG. 8
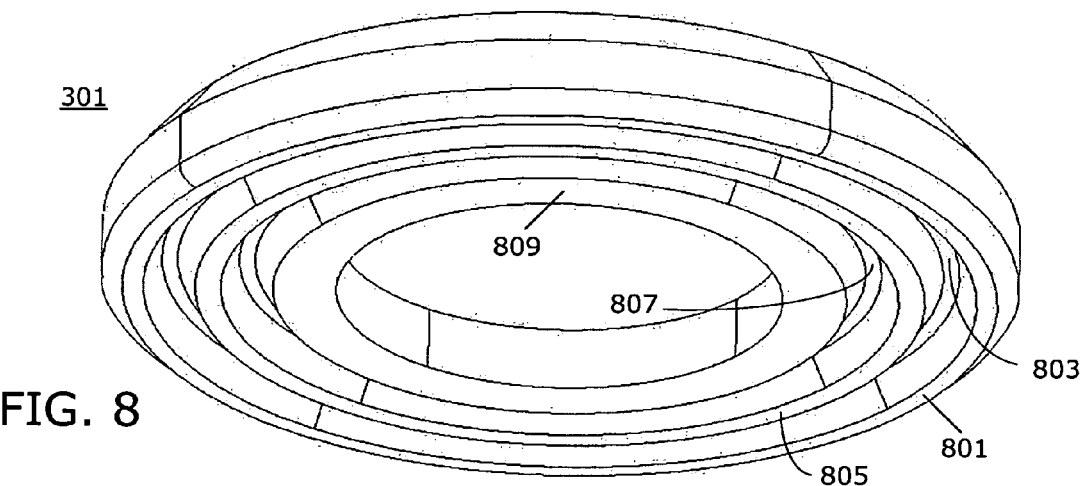
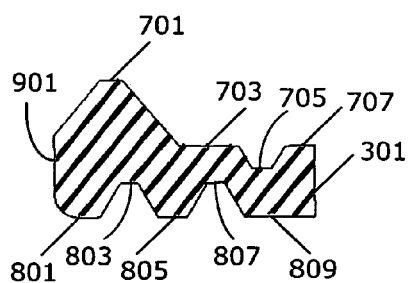
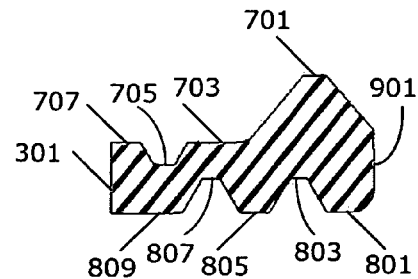
FIG. 9

SEALING SYSTEM FOR MULTIPLE FLUIDS

FIELD OF THE INVENTION

This invention relates to internal combustion engines, including but not limited to methods and apparatus utilized in assembling internal combustion engines.

BACKGROUND OF THE INVENTION

Injection control pressure (ICP) sensors are known in the art. These devices are typically used to measure oil pressure or fuel pressure in order to obtain the fuel injection pressure and to transfer the information to an engine control module or other electronic device for use in controlling fuel injection for an internal combustion engine. ICP sensors may need to be serviced or maintained at times. Thus, it is desirable to locate the ICP sensor in an advantageous place to both measure fuel pressure and to service the ICP sensor.

Accordingly, there is a need for a way to mount an ICP sensor in an internal combustion engine that provides adequate fuel injection pressure readings while maintaining serviceability for the ICP sensor.

SUMMARY OF THE INVENTION

A seal comprises a first surface capable of contacting a valve cover over a first fluid while a second surface, opposed to the first surface, is capable of contacting a seal seat. The seal also comprises a third surface capable of contacting a sensor housing disposed in a second fluid, while a fourth surface, opposed to the third surface, is capable of contacting the seal seat. The seal is capable of separating the first fluid from the second fluid while preventing the first fluid and the second fluid from leaking out of the valve cover.

BRIEF DESCRIPTION OF THE DRAWINGS

FIG. 7 is a top view of a seal for ICP sensor mounted through a valve cover and on a fluid rail in accordance with the invention.

FIG. 8 is a bottom view of a seal for ICP sensor mounted through a valve cover and on a fluid rail in accordance with the invention.

FIG. 9 is a cross-sectional view of a seal for ICP sensor mounted through a valve cover and on a fluid rail in accordance with the invention.

DESCRIPTION OF A PREFERRED EMBODIMENT

The following provides a method and apparatus for mounting an ICP sensor on the fluid rail under the valve cover such the ICP sensor connects through the valve cover to allow electrical connections to be made above the valve cover while maintaining a location for the sensor within the fluid rail under the valve cover. A unique seal having a plurality of ridges and valleys on both sides of the seal is disposed between the valve cover, the ICP sensor, and the fluid rail such that fluids and/or contaminants do not leak under the valve cover or out of the valve cover, while maintaining the ability to easily remove or replace the ICP sensor. The present invention provides the ability to remove the valve cover without having to remove the ICP sensor as well as to remove the ICP sensor without having to remove the valve cover.

Figure 1:
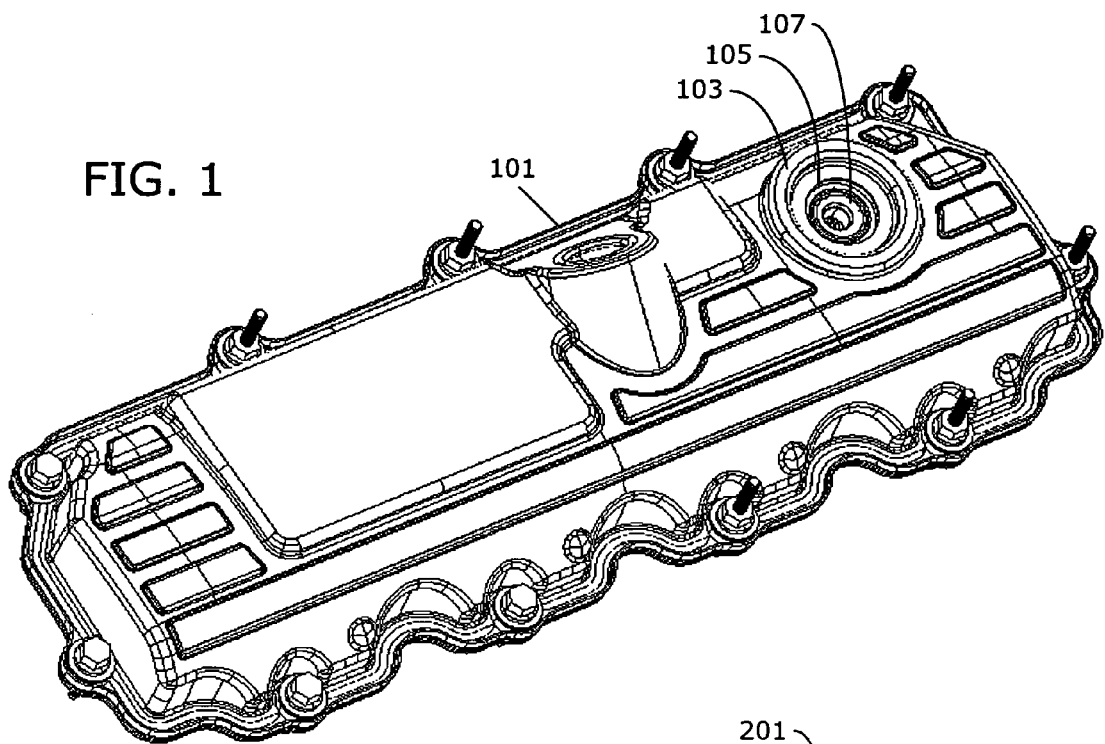
FIG. 1 is a top view of a valve cover in accordance with the invention.
Figure 2:
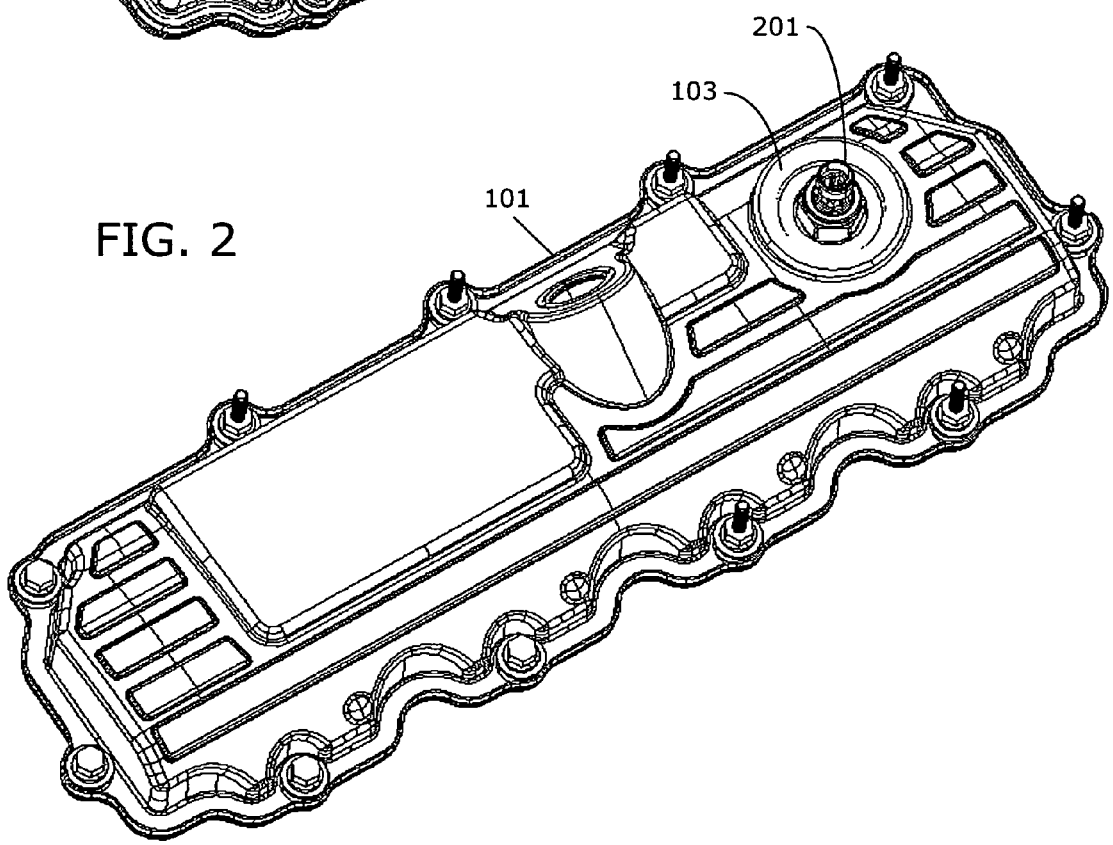
FIG. 2 is a top view of an ICP sensor mounted through a valve cover in accordance with the invention.
Figure 3:
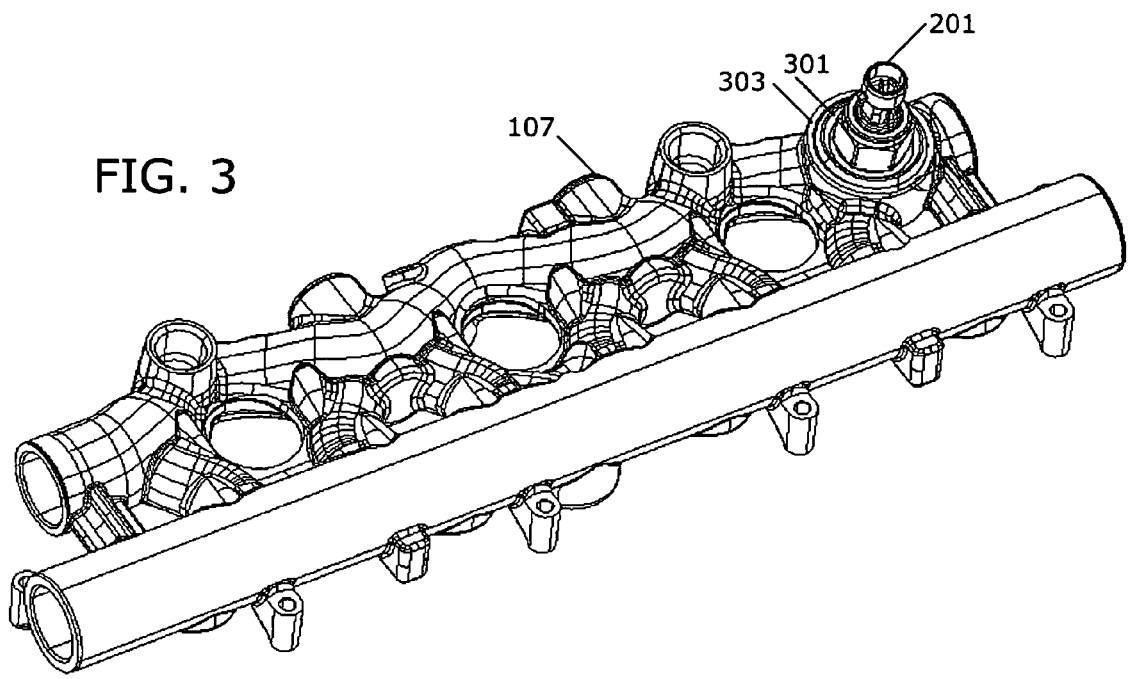
FIG. 3 is a top view of an ICP sensor mounted in a fluid rail in accordance with the invention.
Figure 4:
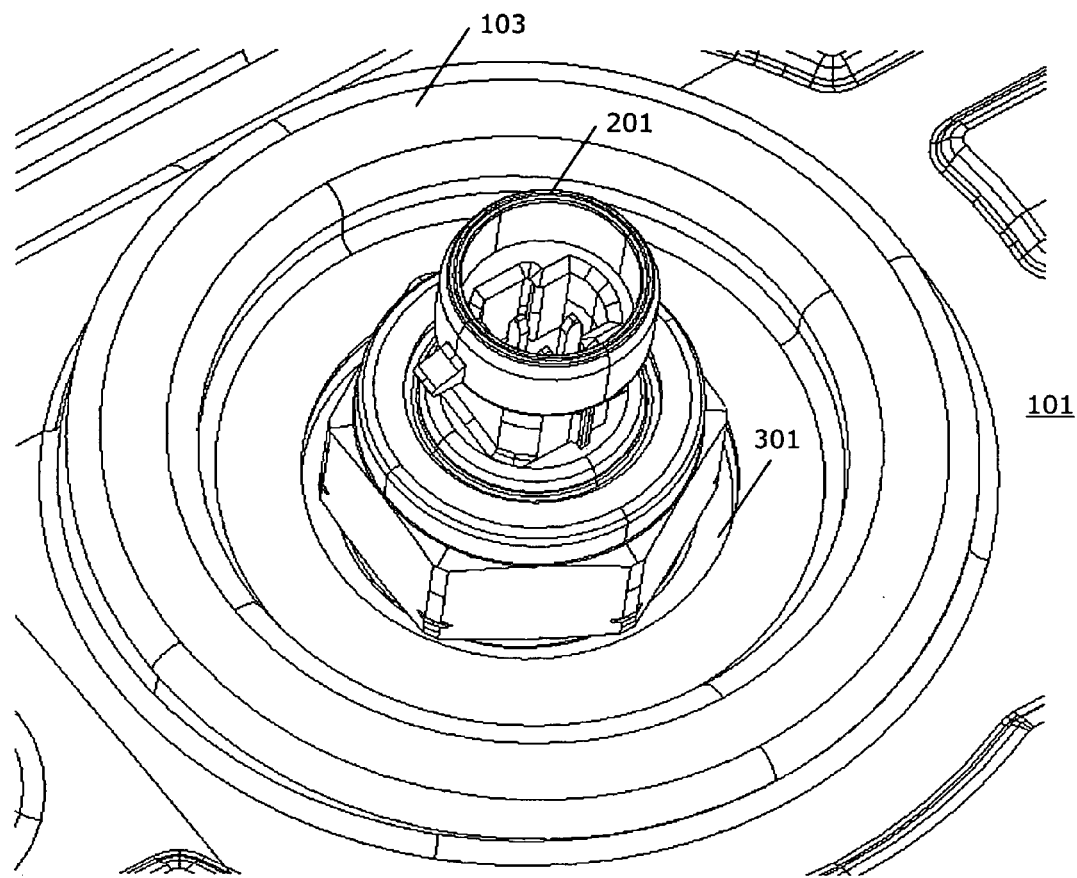
FIG. 4 is a close-up view of an ICP sensor mounted through a valve cover in accordance with the invention.

A top view of a valve cover 101 is shown in FIG. 1 with a circular support member 103 extending away from the surface of the valve cover 101 and outside an opening 105 through which a fluid rail 107 is partially visible. The fluid rail may contain, for example, oil, fuel, or another fluid that is utilized to control fuel injector pressure. As shown in FIG. 2, one part of an ICP sensor 201 is inserted into the fluid rail 107 while another part of the ICP sensor 201 extends above the valve cover 101. Electrical connections to the ICP sensor 201 are located outside the valve cover 101 of the internal combustion engine for easy connection to an engine control module or other device to receive the fuel pressure readings from the sensor 201. The ICP sensor 201 is shown in FIG. 3 operably connected to the fluid rail 107, but with the valve cover 101 removed. A seal 301 is disposed between the ICP sensor 201 and a seal seat 303. A close-up view of the valve cover 101 showing support member 103 and the mounted ICP sensor 201 with the seal 301 is shown in FIG. 4.

Figure 5:
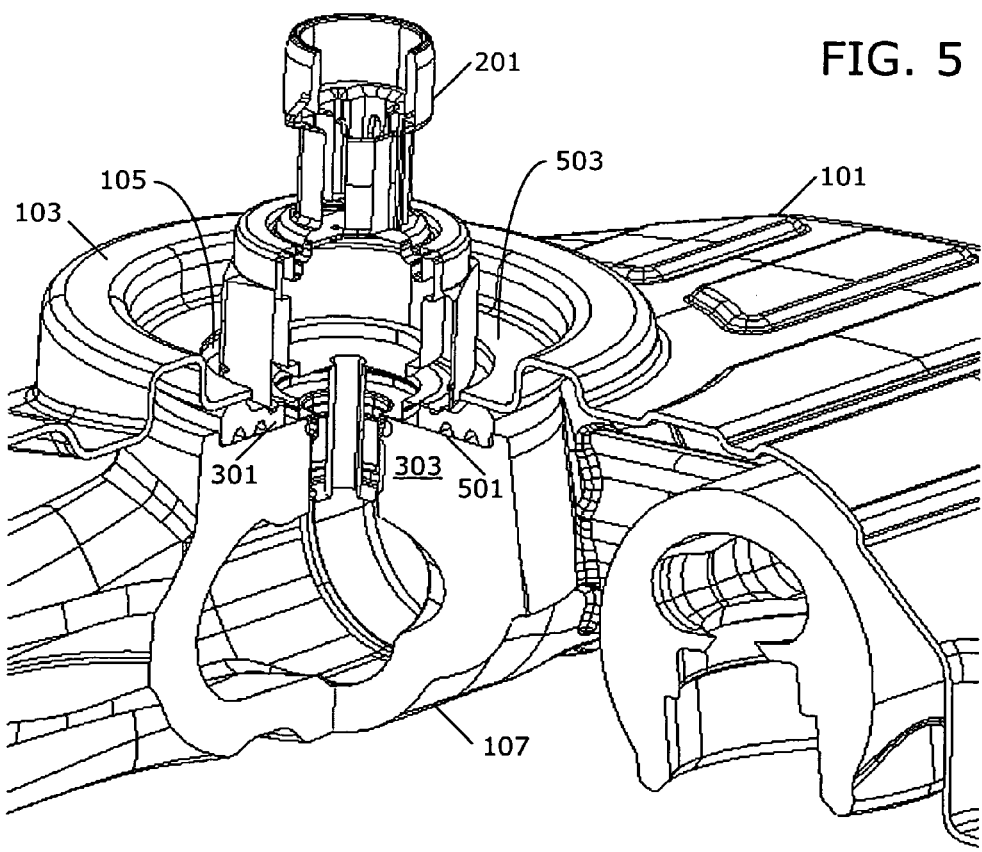
FIG. 5 is a partial cross-sectional view of an ICP sensor mounted through a valve cover and in a fluid rail in accordance with the invention.

A partial cross-sectional view of the ICP sensor 201 mounted through the valve cover 101 and in the fluid rail 107 is shown in FIG. 5. A ninety-degree cutaway of the ICP sensor 201, the fluid rail 107, and the valve cover 101 is illustrated. The seal 301 is disposed between the ICP sensor 201 and a seal face 501 of the seal seat 303 of the fluid rail 107. The seal 301 is also disposed between a compression flange 503 of the valve cover 101 and the seal face 501. The support member 103, which extends away from the valve cover 101, is a strengthening element that provides support for the compression flange 503 such that the valve cover 101, when tightened down, through the support member 103, provides an additional pressure on the compression flange 503. The compression flange 503 compresses the seal 301 to keep cylinder head fluids from engaging with the ICP sensor 201 and from leaking out through the valve cover 101.

Figure 6:
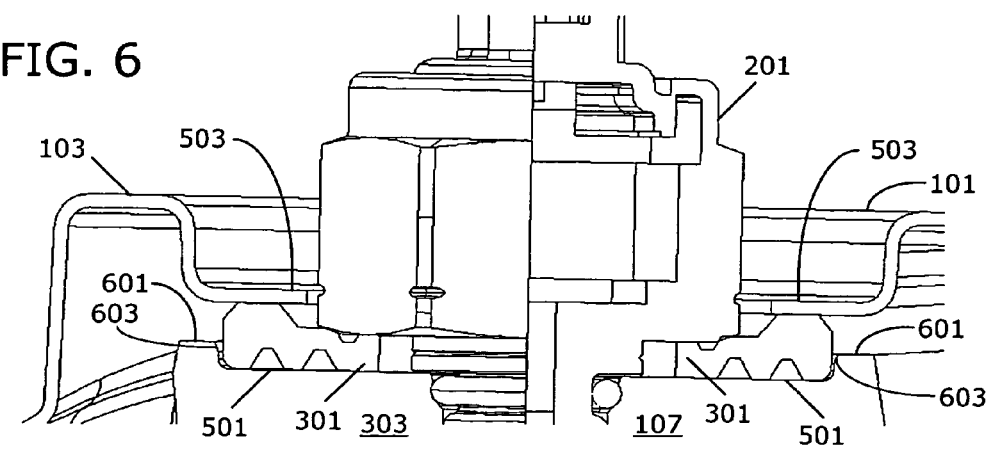
FIG. 6 is a partial cross-sectional view of the side of an ICP sensor mounted through a valve cover and on a fluid rail in accordance with the invention.

The ICP sensor 201 is shown in partial cutaway with a cross-section of the valve cover 101, the seal 301, and the seal seat 303 in FIG. 6. The ICP sensor 201 is mounted in the fluid rail 107 with the seal 301 and valve cover 101 installed. As shown, the seal 301 rests on the seal face 501 of the seal seat 303 of the fluid rail 107. Part of the seal 301 is compressed between the ICP sensor 201 and the seal face 501. Another part of the seal 301 is compressed between the compression flange 503 of the valve cover 101 and the seal face 501.

The sealing seat 303 is comprised of the seal face 501, which is advantageously a substantially flat surface having a central hole through which the ICP sensor 201 mounts into the fluid rail 107. At the outer perimeter of the seal seat 303 is a lip 601 that extends above the seal face 501. The lip 601 prevents the seal 301 from spreading radially outward after installation. An internal edge of the lip 603 is at least partially chamfered or angled radially outward to facilitate locating the seal 301 during installation. The chamfer 603 may be, for example, approximately twenty degrees from a perpendicular to the seal face 501, and the chamfer 603 may be approximately one mm high. The chamfer may extend all the way from the seal face 501 to the outer perimeter or upper edge of the lip 601 or may begin part of the way up the lip 601 and extend to the outer perimeter or upper edge of the lip 601. If the outer diameter of the seal 301 moves away from the seal face 501 as the ICP sensor 201 is installed, the chamfer 603 allows the seal 301 to be reseated. When the valve cover 101 is installed, the chamfer 603 facilitates reseating of the seal 301 on the seal face 501.

A top view of the seal 301 is shown in FIG. 7, a bottom view of the seal 301 is shown in FIG. 8, and a cross-sectional view of the seal 301 is shown in FIG. 9. Although the terms "top" and "bottom" are utilized herein with respect to the seal 301, such terms are utilized for reference only and do not definitively define orientation of the seal 301. The seal 301 may be utilized in any orientation, at any angle, including horizontally, vertically, as well as reversed, upside down, and so forth. The top surface of the seal 301 is comprised of a seal bead 701, two relatively flat surfaces 703 and 707 below the seal bead 701, and a notch 705 below the flat surfaces 703 and 707. The bottom surface of the seal 301 is comprised of three relatively flat surfaces 801, 805, and 809. The outer flat surface 801 curves toward the outer perimeter 901 of the seal 301. Two notches 803 and 807 are present on the bottom surface of the seal 301. The seal 301 is advantageously circular in shape, and the seal bead 701, surfaces 703, 707, 801, 805, and 809, and notches 705, 803, and 807 are all advantageously concentrically circular in nature.

Once the seal 301 is installed as shown in FIG. 6, the seal bead 701 of the seal engages the compression flange 503 of the valve cover 101 while the sealing face 501 engages surfaces 801 and 805 of the seal 301 to prevent fluids from under the valve cover 101 (e.g., in the cylinder head) from leaking into the fluid rail 107 and/or engaging with the ICP sensor 201 and from leaking out of the valve cover 101. The surfaces 703 and 707 engage the housing of the ICP sensor 201 while the sealing face 501 engages the surface 809 of the seal 301 to prevent fuel from the fluid rail 107 from leaking under the valve cover 101 and from leaking out of the valve cover 101. Similarly, the seal 301 prevents fluids and/or contaminants from outside the valve cover 101, such as oil, dirt, grease, and other solid and/or liquid materials, from entering the housing of the ICP sensor 201 and from getting under the valve cover 201.

Although the sealing system is described herein with respect to an ICP sensor mounted to a fluid rail and through a valve cover, the system may be utilized in other situations as well.

The present invention provides numerous advantages. The sealing system and apparatus provide a robust manner of sealing an ICP sensor to a fluid rail while preventing fluids from escaping out of the valve cover and between the rail and the cylinder head. Because the ICP sensor obtains better measurements closer to the fuel injectors, it is advantageous to place one or more ICP sensors on one or more fluid rails, and the sealing system facilitates this advantage. The sealing system set forth herein facilitates installed the ICP sensor on the rail before or after the valve cover is placed on the engine, and also provides for easy serviceability and maintenance of the ICP sensor. Adequate sealing is provided throughout. The valve cover may be removed or serviced without having to remove the ICP sensor, and the ICP sensor may be removed or serviced without having to remove the valve cover.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A seal comprising:
    a first surface contacting a valve cover over a first fluid while a second surface, opposed to the first surface, contacts a seal seat;
    a third surface contacting a sensor disposed in a second fluid, while a fourth surface, opposed to the third surface, contacts the seal seat;
    wherein the seal separates the first fluid from the second fluid while preventing the first fluid and the second fluid from leaking through the valve cover, and wherein the seal seat is disposed the sensor on a component and is removable from the component without having to remove the valve cover.

2. The seal of claim 1, wherein the first surface, the second surface, the third surface, and the fourth surface are concentric.

3. The seal of claim 1, wherein the first surface, the second surface, the third surface, and the fourth surface are circular.

4. The seal of claim 1, wherein an outer edge of the first surface and the third surface are in different substantially parallel planes.

5. The seal of claim 1, further comprising a notch disposed between the first surface and the third surface.

6. The seal of claim 1, further comprising at least one notch disposed between the second surface and the fourth surface.

7. The seal of claim 1, wherein the valve cover is removable without having to remove the sensor.

8. The seal of claim 1, wherein the sensor is an injection control pressure sensor.

9. The seal of claim 1, wherein the seal is capable of preventing contaminants from outside the valve cover from entering the sensor.

10. A sealing system comprising:
    a sealing seat disposed on a fluid rail, the sealing seat comprising:
        a seal face having an outer perimeter and a cavity in fluid communication with a first fluid;
        a lip disposed at the outer perimeter of the seal face;
    a valve cover over a second fluid, the valve cover comprising a raised support member connected to a compression flange having an opening aligned with the cavity of the sealing seat such that a sensor is insertable through the opening and the cavity;
    a seal comprising:
        a top face comprising a first surface in contact with the compression flange and a second surface in contact with the sensor;
        a bottom face comprising at least two surfaces in contact with the seal face and disposed radially inward of the lip;
    wherein the seal separates the first fluid from the second fluid and prevents the first fluid and the second fluid from leaking out of the valve cover.

11. The sealing system of claim 10, wherein a radially inner surface of the lip is chamfered.

12. The sealing system of claim 10, wherein the top face of the seal further comprises a seal bead, wherein the first surface is disposed on the seal bead, wherein the second surface is separated into two surfaces by a notch, and wherein the first surface is on a plane that is substantially parallel to the two surfaces.

13. The sealing system of claim 10, wherein the bottom surface of the seal comprises a third surface, wherein each of the three bottom face surfaces are separated by a notch.

14. The sealing system of claim 10, wherein the seal is circular and is formed of a plurality of concentric surfaces on both sides of the seal, the plurality of concentric surfaces comprising the first surface and the second surface on the top face, and the at least two surfaces on the bottom face.

15. The seal of claim 10, wherein the sensor is removable from the fluid rail without having to remove the valve cover.

16. The seal of claim 10, wherein the valve cover Is removable without having to remove the sensor.

17. The seal of claim 10, wherein the sensor is an injection control pressure sensor.

* * * * *